United States Patent [19]

Kumar

[11] 3,962,335

[45] June 8, 1976

[54] TEXTURED PROTEIN PRODUCT AND PROCESS

[75] Inventor: Surinder Kumar, Buffalo Grove, Ill.

[73] Assignee: The Quaker Oats Company, Chicago, Ill.

[22] Filed: May 8, 1975

[21] Appl. No.: 575,623

[52] U.S. Cl. .............................. 426/574; 426/441; 426/442; 426/580; 426/656; 426/657; 426/802

[51] Int. Cl.² ........................................ A23J 3/00

[58] Field of Search .......... 426/506, 656, 802, 441, 426/657, 442, 574, 580

[56] References Cited

UNITED STATES PATENTS

| | | | |
|---|---|---|---|
| 3,759,715 | 9/1973 | Loepiktie et al. | 426/802 X |
| 3,840,671 | 10/1974 | Kim et al. | 426/802 X |
| 3,852,484 | 12/1974 | Cabot | 426/802 X |
| 3,863,019 | 1/1975 | Strommer | 426/802 X |
| 3,870,805 | 3/1975 | Hayes et al. | 426/506 X |

*Primary Examiner*—James R. Hoffman
*Attorney, Agent, or Firm*—Mathew R. P. Perrone, Jr.

[57] ABSTRACT

A textured protein product is obtained by precipitating vegetable or animal protein from a protein slurry, shaping the recovered protein and heating the shaped protein in a liquid hydrophobic medium.

14 Claims, No Drawings

TEXTURED PROTEIN PRODUCT AND PROCESS

BACKGROUND OF THE INVENTION

This invention relates to food, and more particularly to textured protein that is useful in formulating fabricated foods for human and animal consumption.

Protein deficiency is common throughout many parts of the world, with protein malnutrition being the most wide spread and serious nutritional problem in the underdeveloped areas of the world. Rapidly increasing population of the world is further worsening the shortage of protein supply. It is, therefore, necessary to utilize the available protein supply in a manner that is most efficient. High quality meat is one of the most popular sources of diet protein, and the American population has developed taste for the texture, flavor and mouthfeel of meat products. However, present economic conditions have led to scarcity of high quality meat products necessitating the development of meat analogs from more readily available components that are less expensive. Furthermore, the presence of cholesterol and highly saturated fats in meat limit their intake by people with certain health problems such as atherosclerosis. Another sector of world population does not consume meats due to religious or personal beliefs. Therefore, a need exists for the development of palatable, high-quality protein foods from new and more readily available secondary protein sources. There are many sources of secondary protein available. Besides high quality meat, other animal proteins are lower quality meat, poultry, fish, eggs, milk and milk products. Soybeans, peanuts, cereals and other plant or vegetable proteins are the other major secondary protein sources. However, many of these plant proteins and animal protein lack the required palatability and appearance to make them suitable for use. Various methods of modification of these protein sources are being used to make them more palatable both from taste and visual standpoints and therefore, more acceptable. Processes also have been developed to utilize animal and plant proteins in fabricating foods similar in appearance, texture, flavor and taste to the natural foods already accepted.

By high quality meat is meant the customary parts of slaughtered animals ordinarily sold for human consumption. By low quality meat is meant the edible parts of slaughtered animal suitable for human consumption but unacceptable to humans from an aesthetic or appearance point of view. If this low quality meat and other referenced animal protein are modified to have the appearance of high quality meat, an additional source of acceptable protein is provided.

By milk products is meant those protein containing products derived from milk. For example, casein and casein salts are protein products derived from milk. Typical edible casein salts include sodium caseinate, calcium caseinate, ammonium caseinate, magnesium caseinate and other edible casein salts. Modified milk products having the characteristics of high quality meat are also more acceptable than the milk product.

One such modification process for making meat analogs is basically known as texturization of proteins. There are three basic processes for forming texturized proteins. There is a spinning process, an extrusion process, and a glass-puffing extrusion process. The spinning process involves extruding a protein dope or solution through a die into a coagulation bath to form fibers. The problem becomes obvious during the extrusion of the dope and the determination of a proper coagulation bath. In the extrusion process, high pressures and temperatures are used to form a plexilaminate. In this product the cells of the product are longer in the direction of the extrusion. The glass-puffing process is also a high pressure and high temperature process. The use of high pressure and high temperature requires sophisticated, expensive equipment, capital, and skills to handle. The high temperature and pressure also damages the protein thus processed. Furthermore, the protein thus being processed still retains some of its undesirable flavor and taste characteristics. For example, the taste of the protein has not been improved. The type of protein being processed may well not have the desired palatability or aesthetic acceptability. Thus, while there exist processes for forming suitable texturized proteins, many problems still remain to be solved in producing acceptable protein substitutes for meat.

Another problem is that the secondary protein source individually may lack the required nutritional completeness customarily considered acceptable for a protein source. A possible solution to point toward nutritional completeness is combining at least two secondary proteins in one product. The process of combining two or more secondary proteins to form a meat analog suffers from the same difficulties as forming a meat analog from a single protein source.

In the prior art spun protein processes, there is an effluent disposal problem. This effluent results from the basic nature of prior art wet processes. In order to treat the raw protein, the raw material is dissolved in an alkali medium. For example, soy protein isolate can be dissolved in sodium hydroxide solution to form a protein dope. This solution of protein is then extruded into an acid coagulation bath. This acid bath coagulates the protein, and the protein fibers are formed. The fibers thus formed are tender and must be hardened in a salt solution bath to make them suitable for use. Thus, there are three basic steps in the prior art for forming spun protein fibers. In each of the three basic steps a liquid residue is left after the process is complete. It becomes a problem to dispose of these residues.

Recent developments in protein texturization which avoid some problems in protein texturization include the sheeting and film forming technologies. These technologies, however, require forming and partial drying of a particular product before that product can be shaped and texturized. In addition, the textured product loses its shape and identity upon cooking unless pretreated with denaturing agents such as acids and salts. The liquid residues left in the denaturing or fixing process are similar to those in the spinning process and aggravate the waste disposal problem.

Therefore, it is desirable to develop a process for protein texturization that is simple, inexpensive, with minimum waste disposal problems, and having no adverse effect on the nutrition and flavor of the protein being texturized.

SUMMARY OF THE INVENTION

Therefore, it is an object of this invention to provide an improved protein product.

Also, an object of this invention is to provide an improved protein product from readily available materials.

A further object of this invention is to provide an improved textured protein.

It is a still further object of this invention to provide a process for forming a textured protein from a slurry directly.

Another object of this invention is to provide a process for forming a textured protein having an improved meat-like-texture.

Yet another object of this invention is to provide a process for making a textured protein and avoid the effluent problem.

A further object of this invention is to provide a process for forming a textured protein without adversely affecting the nutritional properties of protein.

Another object of this invention is to provide an improved textured protein product from highly nutritional proteins or blends of nutritionally complementary proteins.

These and other objects of the invention are accomplished by hydrating a protein from plant or animal source or any blend thereof, recovering the protein, shaping the protein into desired shapes and sizes, and subjecting the protein to a hydrophobic medium.

DESCRIPTION OF THE PREFERRED EMBODIMENTS

A textured protein product is obtained by hydrating a plant and/or animal protein, recovering the protein by manipulating the pH, temperature, and/or ionic equilibrium of the aqueous environment, forming a recovered protein into desired shape, and subjecting the shaped pieces to a selected hydrophobic liquid medium.

Many possible protein sources exist which are suitable for use in this process. The critical feature of the protein source is that it contains between about 1% and 98% by weight protein. More preferably the vegetable protein source should contain about 65–95% by weight protein. More preferably the protein content of the vegetable protein source should be about 90% by weight of the source. Vegetable protein sources for use in this invention include soy protein, cottonseed protein, sesame protein, peanut protein, cereal protein, and mixtures thereof. Other suitable protein sources are also operable in this invention provided, however, they meet the protein content requirement set forth above. Within the cereal protein family, those especially suitable for use in this invention include wheat gluten, oat protein, and corn protein. Animal protein sources such as milk, blood, salts of casein, and albumen may be used individually or in blends with plant proteins. Low quality meat as defined above is also suitable for use either alone or in combination. Thus, it may be seen that the secondary protein and mixtures thereof, as defined above, are suitable for use in this invention. A simple test known in the art determines a suitable combination to provide desired level of nutrition in the product.

The secondary protein source, which is more readily available but still produces desirable products as to palatability and ease of manufacture, is the soy protein. Of course, there are many soy protein sources — including soy flour, soy protein concentrate, and soy protein isolate in order of increasing proteins. Additionally, one or more protein sources are suitable for use in this product and process. In fact, any reasonable mixture of the proteins listed above can be used to form the product of this invention. A particularly suitable protein mixture is about a 1:1 ratio of sodium caseinate and soy protein isolate — although other ratios and protein sources are used.

The soy protein is the preferred product for this invention because it is abundantly available in this country. Soy protein ingredients are the most commonly available in the marketplace at a relatively low cost. Of all the commercially available protein ingredients, soy protein has very acceptable nutritive properties. Soy protein is also abundantly manufactured for use in human food products, whereas the other oil seed proteins and cereal proteins are not as readily available. Any form of a desired vegetable protein is suitable for use in this invention whether it is the concentrate, isolate, or flour. The only critical feature of the vegetable protein source is that it has the desired protein content. As above stated the desired protein content is broadly from about 1% to about 98% protein by weight. More preferably the protein content of the vegetable protein is about 50% to about 98% protein by weight of the vegetable protein. Most preferably about 90% by weight is suitable for use in the invention.

The texture, flavor, and nutritional quality of the textured product is controlled by the selection of protein or protein blend, extent of treatment of the slurry or dough, selection of acid, amount of water retained in the recovered protein, selection of the hydrophobic medium and the time and temperature of treatment in the hydrophobic liquid. A soft elastic texture, if desirable, is obtained by using sodium caseinate or sodium caseinate-soy isolate blend as the protein source in the slurry, citric, lactic or tartaric acid for recovering protein, retaining 60–70% water in the recovered protein and fixing the protein in a fat bath adjusted at 200°C.

While it is not desired to be bound by any particular theory covering the operation of this invention, nevertheless, the following postulate is offered. The treatment of the protein with water causes binding of water by the hydrophilic groups of protein, thereby hydrating the protein molecules. In the hydrated state, protein molecules are more flexible and are more prone to structural changes. The hydrated protein molecules in water normally have hydrophilic groups extending outwards and hydrophobic or lyophilic groups towards the inside of the molecule. When the hydrated protein is subjected to treatment with fat or oil, the hydrophobic groups tend to come to the surface of the protein molecule because of the affinity of hydrophobic groups for fat. On the other hand the hydrophilic groups are repelled by fat towards the inside of the protein molecule. A massive change in protein structure and the resulting interactions between various groups of protein produce a textured protein that is insoluble in water and does not disintegrate upon cooking.

To the selected protein or protein blend, water is added in sufficient quantity to form either a slurry or a dough in order to hydrate the protein. It is critical to hydrate the protein. The most effective hydration of the protein is achieved in slurry. A suitable slurry contains up to about 20% by weight solids based on the weight of the slurry. More preferably, the slurry contains about 5% to about 15% by weight solids. Most preferably the slurry contains about 9% to about 11% by weight solids. At this solids concentration which is indicated as most preferred for the slurry, the most complete hydration is obtained in the protein. Thus, the water in the slurry is used most efficiently at this concentration. Of course, a slurry is only formed if the starting protein is a solid. Above about 20% by weight solids, the combination of protein and water loses the liquid characteristic of the slurry, and becomes more viscous to approach a dough-like consistency. The percentages of solids around 20 is not a precise dividing line between liquid characteristics of a slurry and viscous dough characteristics. The distinction between slurry and dough depends on the protein or protein mixture being used in the water. Whether or not a dough or a slurry is formed at a particular solids concentration in the water is easily determined by a person having ordinary skill in the art. In case a liquid protein source such as milk or blood, addition of water is not necessary.

In interaction between the various components of the protein source provides conditioning of the dough or slurry and is usually accomplished by heating and/or using selected polysaccharides. Typical polysaccharides that may be used are carrageenan, carboxymethylcellulose, sodium alginate, guar gum, gum arabic, and others that interact with proteins. The addition of small amounts of polysaccharides assures more complete recovery of proteins.

One or more polysaccharides may be added to the slurry in order to condition the slurry. This conditioning is used individually or in combination with heat to provide tht total conditioning of the slurry or dough. About 0.1 to about 10% by weight polysaccharides based on the weight of protein being used is suitable for use in the conditioning process. More preferably about 0.5 to about 5% by weight polysaccharide is used. Most preferably about 2% to about 3% by weight polysaccharide is used. The most preferred range achieves the desired gelling and conditioning of the protein at the most economical use of material, time and processing.

If a slurry is formed the pH of the final material is then adjusted until precipitation of protein occurs as a gelatinous mass. The desired pH is generally lower than 7.0 and preferably in the range of 4.0 to 6.0. Most preferably, the pH ranges from 4.5 to about 5.5. The pH adjustment is accomplished by using any suitable edible acid or mixture of acids. An especially suitable acid is citric acid. Other suitable acids include lactic, tartaric, succinic, malic, fumaric, phosphoric, hydrochloric, and sulfuric. If the acid is added to a slurry, the protein effectively precipitates and settles out to be recovered by filtration. If the acid is added to a dough, it must be blended so that a uniform distribution of the acid in the dough is achieved. The most effective way to add the acid to the slurry is to heat the slurry to the boiling point of the slurry. In this fashion, the precipitation from the slurry and the hydration of the protein source is more effective. However, any heating treatment combined with the acid treatment is operable for a treatment of the slurry.

Whether the protein is precipitated from a water slurry, formed into a dough, or hydrated in another suitable fashion, the next step is a shaping of the hydrated protein source. This shaping is generally effected by pressing the hydrated protein source to form a continuous mass and then obtaining small pieces of the resultant mass. The small pieces may be obtained by cutting. Alternatively, the hydrated protein may be sifted through screens of different mesh sizes to obtain pieces of different sizes.

Pressing pressures for the hydrated protein range up to about 10,000 pounds per square inch gauge. Preferably the pressing pressure ranges from about 2,000 to 10,000 pounds per square inch gauge. More preferably, the pressing pressure is about 3,000 to about 5,000 pounds per square inch gauge. Above 10,000 pounds pressure is usable but undesirable. The undesirability is due to the increased equipment and other factors in creating the higher pressure.

After shaping the protein is treated in a hydrophobic medium. Basically, the formed material is heated in an edible oil for a period of time. Preferably the heating temperature ranges from 145°C. to about 275°C. The heating time ranges from about 10 to about 200 seconds. More preferably, the heating time ranges from about 15 to about 120 seconds. Most preferably, the heating time is from about 30 to about 100 seconds. The heating time decreases as the temperature increases. Suitable vegetable oils for treating the hydrated protein include those materials which are liquid at the heating temperature. Typical examples of the edible oil or fat include corn oil, soybean oil, oat oil, cottonseed oil, hydrogenated oils, margarines, shortenings, milk fat and other fats from animal sources. More preferably the temperature ranges from 175°C. to 225°C.

The final product is a texturized protein having a meat-like texture. Standard acceptable coloring and flavor can be added to the product at a suitable point in the process to achieve desirable aroma and coloration. For example, such addition may be made to the hydrated protein before the shaping step. In the fashion, the desirability of the product is improved because it more closely resembles meat.

After treatment in the fat, the product is cooled and placed in a bath. Preferably the bath is a water bath which is boiling. This bath step, however, is optional. The texture is improved by placing the product in this heated water bath.

It is well recognized in the art that boiling temperature of water on a practical basis is generally around 100°C. due to the differring elevations throughout the United States. Of course, it is well recognized that the boiling temperature of water varies with the pressure and that this adjustment in the boiling temperature will have no substantial effect on the process at the points where boiling water is called for, so long as the temperature of the boiling water is above 90°C. These water temperatures are also applicable for the conditioning of the protein whether in slurry or dough form. Thus, it may be seen that the post treatment and the conditioning temperatures are substantially the same in this process.

Having now disclosed the invention, the following examples are offered as an illustration thereof without intention of unduly limiting the invention. Unless otherwise specified, all parts and percentages are by weight both in the examples and throughout the specification.

EXAMPLE 1

A 10% slurry of soy protein isolate is prepared in water. The slurry is heated in a closed vessel to 100°C. A calculated amount of 10% citric acid is added to the heated slurry to precipitate the protein. This addition of citric acid results in a pH ranging from about 4.5 to about 5.0 for the slurry. The precipitate of soy protein isolate is washed with cold water to remove excess acidity and then recovered by filtration. The recovered precipitate is pressed to remove excess water. The pressing forms the soy protein isolate into a meat-like piece. This meat-like piece is then cut into pieces. The pieces are heated in a corn oil bath adjusted to about 200°C. for a period of about 40 seconds. Then the pieces are removed from the corn oil bath and cooled to ambient temperature. Finally, the pieces are placed in an enclosed water bath for a period of about 10 minutes to form a chewy meat-like texture which is cookable without disintegration. The treatment in the water bath at boiling temperature ranges from about 5 to about 15 minutes and completes the texture forming of the meat. No salts or other chemical are present in the water bath.

EXAMPLE 2

To form a dough, 100 grams of soy protein isolate, 30 mililiters of 10% citric acid, and 40 mililiters of water are mixed. The resulting dough is pressed and cut into chunks. The chunks are heated in a corn oil bath adjusted to 200°C. for a period of 40 seconds. The pieces are cooled and heated in a boiling water bath for 5 minutes. The resulting pieces have a chewy meat-like texture.

EXAMPLE 3

Example 1 is repeated, except that soy flour (50% protein by weight) is used as the protein source in place of soy protein isolate. Substantially similar results are obtained.

EXAMPLE 4

Example 1 is repeated with substantially similar results, except that soy protein concentrate (70% protein by weight) is used as the protein source in place of soy protein isolate.

EXAMPLE 5

Example 1 is repeated with substantially similar results except that sodium casseinate is used in place of soy protein isolate.

EXAMPLE 6

Homogenized whole, partially skimmed or skim milk is used in place of 10% slurry of soy protein in Example 1, with similar results.

EXAMPLE 7

Example 1 is repeated, with substantially similar results, except that a mixture of soy protein isolate and sodium caseinate is used in place of soy protein isolate.

EXAMPLE 8

Example 1 is repeated with substantially similar results except that 10% hydrochloric acid is used for recovering protein from the slurry.

EXAMPLE 9

Example 1 is repeated with substantially similar results except that sodium alginate is mixed with soy protein isolate at the rate of 1% by weight of protein before making the slurry.

Having now fully described and completely disclosed the invention, what is sought to be secured by Letters Patent of the United States and is claimed is:

I claim:

1. A process for forming a textured protein comprising:
    a. hydrating at least one vegetable or animal protein source to form a slurry;
    b. heating the slurry to at least the boiling point of the slurry to condition the protein source;
    c. recovering the conditioned protein source;
    d. shaping the recovered protein source;
    e. heating and shaped protein source in a liquid hydrophobic medium to induce texture in the protein source; and
    f. recovering the textured protein source.

2. The process of claim 1 wherein recovering of the conditioned protein source is accomplished by:
    1. adjusting the pH of the slurry to a range of about 4.0 to about 6.0 in order to form a precipitate of the protein source in the slurry; and
    2. filtering the slurry to recover the precipitate.

3. The process of claim 2 wherein the shaping is accomplished by pressing the precipitate to form a protein mass and dividing the mass into a plurality of protein pieces.

4. The process of claim 3 wherein the shaped protein source is heated in a liquid hydrophobic medium by: heating the shaped protein source in an edible oil bath at a temperature in the range of about 145°C. to 275°C. for a period of about 10 seconds to about 200 seconds in order to form the textured protein.

5. The process of claim 4 further comprising:
    g. cooling the textured protein;
    h. heating the textured protein in boiling water to form a treated textured protein; and
    i. recovering the textured protein.

6. The process of claim 5 wherein:
    a. the at least one vegetable protein source is soy protein isolate; and
    b. the slurry is adjusted to a pH of 4.5 to 5.3 and heated to 100°C.

7. The process of claim 6 wherein the shaped protein source is heated in a vegetable oil at about 200°C. for 40 seconds.

8. The product of the process of claim 1.

9. The process of claim 1 further comprising adding a material selected from the group consisting of polysaccharide, carboxymethylcellulose, and mixtures thereof to the slurry before the heating of the slurry.

10. The process of claim 9 wherein the polysaccharide is selected from the group consisting of carrageenan, sodium alginate, guar gum, and gum arabic; and comprises 0.1% to 10% by weight of the protein.

11. The process of claim 1 wherein the shaping is accomplished by pressing the recovered protein source at a pressure up to about 10,000 pounds per square inch gauge, to form a pressed protein and forming the pressed protein into small pieces.

12. The process of claim 11 wherein said pressure is 3,000 to 5,000 pounds per square inch gauge.

13. The process of claim 1 wherein the protein source contains 50% to 98% protein.

14. A process for forming a textured protein comprising:
    a. hydrating at least one vegetable or animal protein source to form a slurry;
    b. adding a material selected from the group consisting of polysaccharide, carboxymethylcellulose and mixtures thereof to the slurry;
    c. adjusting the pH of the slurry to a range of about 4.0 to about 6.0 to condition and precipitate the protein source;
    d. recovering the precipitate protein source;
    e. shaping the recovered protein source;
    f. heating the shaped protein source in a liquid hydrophobic medium to form the textured protein; and
    g. recovering the textured protein.

* * * * *